United States Patent [19]

Orthmann et al.

[11] Patent Number: 5,360,885
[45] Date of Patent: Nov. 1, 1994

[54] PROCESS FOR THE CONTINUOUS PRODUCTION OF POLYURETHANE AND POLYURETHANE UREA ELASTOMERS

[75] Inventors: Ernst Orthmann, Dormagen; Klaus Wulff, Krefeld; Peter Hoeltzenbein, Dormagen; Helmut Judat, Langenfeld; Hans Wagner, Dormagen; Gottfried Zaby, Leverkusen; Herbert Heidingsfeld, Frechen, all of Germany

[73] Assignee: Bayer Aktiengesellschaft, Leverkusen, Germany

[21] Appl. No.: 163,059

[22] Filed: Dec. 7, 1993

Related U.S. Application Data

[63] Continuation-in-part of Ser. No. 9,159, Jan. 26, 1993, abandoned.

[51] Int. Cl.⁵ ............................................. C08G 18/08
[52] U.S. Cl. ......................................... 528/49; 528/59; 528/69; 528/76; 528/80; 528/84; 528/85; 521/79; 521/917
[58] Field of Search ............... 528/49, 59, 69, 76, 528/80, 84, 85; 521/79, 917

[56] References Cited

U.S. PATENT DOCUMENTS

| | | | |
|---|---|---|---|
| 3,642,964 | 2/1972 | Rausch, Jr. et al. | 264/40 |
| 3,963,679 | 6/1976 | Ullrich et al. | 260/75 NE |
| 4,250,292 | 2/1981 | Niederdellmann et al. | 528/44 |
| 4,261,946 | 4/1981 | Goyert et al. | 264/211 |
| 4,334,783 | 6/1982 | Suzaka | 366/69 |
| 5,117,048 | 5/1992 | Zaby et al. | 560/347 |

FOREIGN PATENT DOCUMENTS

| | | |
|---|---|---|
| 1106959 | 5/1961 | Germany . |
| 1157722 | 11/1963 | Germany . |
| 1165852 | 3/1964 | Germany . |
| 2447368 | 4/1976 | Germany . |
| 2549372 | 5/1977 | Germany . |
| 2823762 | 12/1978 | Germany . |
| 3223424 | 12/1983 | Germany . |
| 1508317 | 4/1978 | United Kingdom . |

*Primary Examiner*—Maurice J. Welsh
*Attorney, Agent, or Firm*—Joseph C. Gil

[57] ABSTRACT

The present invention relates to the continuous production of polyurethane and polyurethane urea elastomers by reaction of polyisocyanates with isocyanate-reactive compounds in a mixing nozzle.

12 Claims, 1 Drawing Sheet

PROCESS FOR THE CONTINUOUS PRODUCTION OF POLYURETHANE AND POLYURETHANE UREA ELASTOMERS

CROSS REFERENCE TO RELATED APPLICATION

This application is a continuation-in-part of U.S. application Ser. No. 08/009,159, filed on Jan. 26, 1993 now abandoned.

BACKGROUND OF THE INVENTION

The present invention relates to an improved process for the continuous production of polyurethane and polyurethane urea elastomers by reaction of polyisocyanates with polyhydroxy compounds and/or polyamine compounds having molecular weights of 400 to 10,000 and chain-extending agents having a molecular weight below 400 and, optionally monofunctional compounds, optionally in the presence of activators, stabilizers, lubricants and other additives known in the art. Thermoplastic polyurethane and polyurethane urea elastomers obtained by reaction of polyisocyanates with polyhydroxy compounds and/or polyamino compounds having molecular weights of 400 to 10,000 and chain-extending agents having a molecular weight below 400 and, optionally, monofunctional compounds, optionally in the presence of activators, stabilizers, lubricants and other additives known in the art, are described in detail in Kunststoff-Handbuch (Vol. VII) by Vieweg-Höchtlen, Carl-Hanser-Verlag. There are various known processes for the production of these elastomers on an industrial scale; see, e.g., German Offenlegungsschriften 1,106,959, 1,157,722, 1,165,852, 2,059,570, 3,302,564, 2,423,764, 2,302,564, 2,447,368, 2,549,372, 2,823,762, 2,842,806, and 3,223,424.

A continuous process in which the elastomers are produced in a twin-screw extruder with co-rotating shafts and self-cleaning screw geometry at temperatures of 70° to 260° C. is described in German Offenlegungsschriften 2,842,806 and 2,854,386. The disadvantage of this process is that the components are very thinly liquid at the temperatures mentioned, the mixing effect obtained by two co-rotating shafts is not great and the residence time is too short for a complete reaction. To achieve complete reaction, the products formed have to be after-treated in expensive apparatus and have a more or less large gel content which prevents them from being used for extrusion to very thin films. Despite thermal after-treatment, the elastomers formed remain unstable in their properties such as flow, demoldability, gel content and degree of branching, which greatly reduces the dependability of supply to customers of elastomer products for the reliable and satisfactory production of extrudates or for the production of viscosity-stable solutions for coating purposes.

German Offenlegungsschrift 2,302,564 describes small-volume, stirred mixing chambers and mixing nozzles for mixing the starting components for the production of polyurethane and polyurethane urea elastomers. Mixing nozzles are known elements for mixing liquids. Detailed particulars of the geometry of the mixing nozzle and the flow rates are not provided. In the Examples, a mixing head rather than mixing nozzles is used for the production of the polymers. A process using a mixing nozzle is not described.

German Offenlegungsschrift 2,823,762 describes a continuous process in which the starting components are passed through a static premixer, in which they are intermixed, the product temperature being so low that a reaction is largely avoided, thus preventing the products from caking. Although thorough mixing is achieved by this process, separation in the reaction zone is not prevented by suppression of the reaction at low temperatures. The partly reacted mixture does not have sufficient reaction time in the following step to react out completely and uniformly. Accordingly, the problem addressed by the present invention was to improve the existing process for the continuous production of polyurethane and polyurethane urea polymers by reaction of polyisocyanates with polyhydroxyl compounds and/or polyamine compounds having molecular weights of 400 to 10,000 and chain-extending agents having a molecular weight below 400 and, optionally, monofunctional compounds, optionally in the presence of activators, stabilizers, lubricants and other additives known in the art, in a twin-extruder with co-rotating shafts and self-cleaning screw geometry at temperatures of 70° to 260° C. to such an extent that a) the components are mixed and, at the same time, are very finely dispersed, b) rotating parts should not cause any sealing problems relative to the outside environment during mixing, c) no caking of product should occur in the mixing units during mixing and d) there should be no caking or blockages in the system, e) the system is easy to clean, f) the end product has reacted out to a greater extent after leaving the twin-screw extruder, g) changes in the properties of the end product after production, such as increases in viscosity, are small, and h) better extrusion qualities are obtained.

DESCRIPTION OF THE INVENTION

Figure 1:
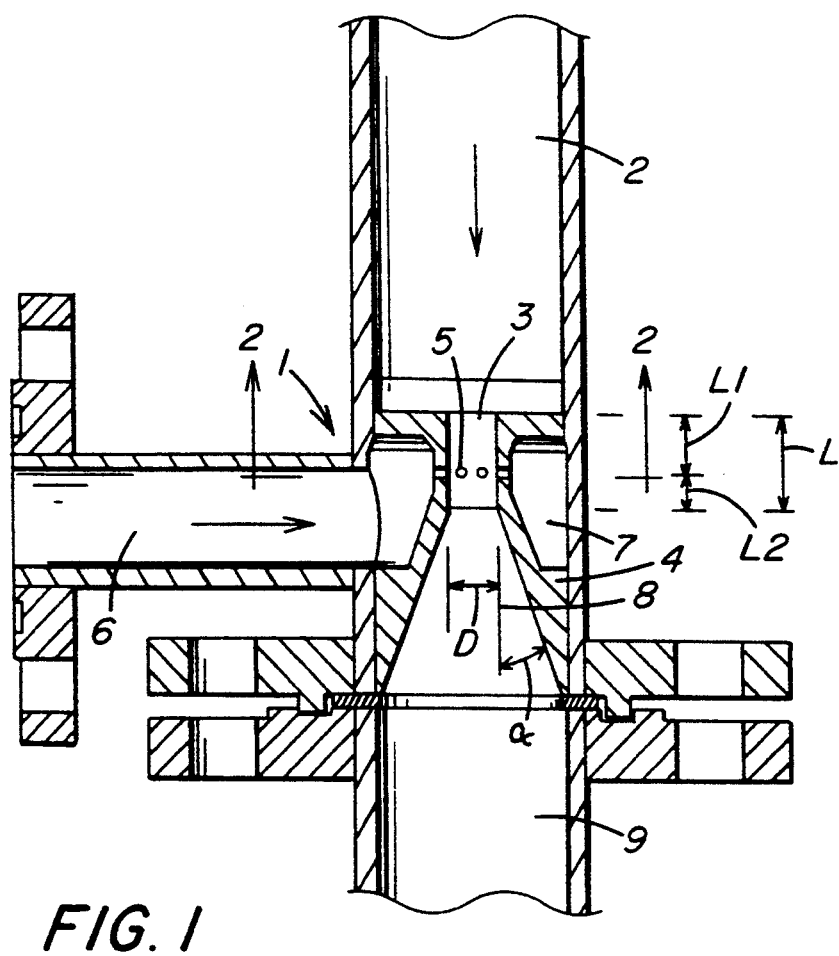
FIG. 1 is a longitudinal section through nozzle according to the present invention.
Figure 2:
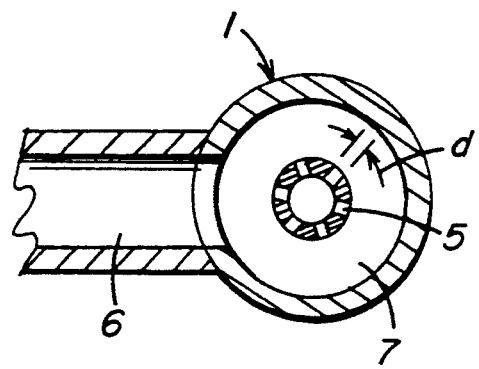
FIG. 2 is a sectional view on the line A–B of FIG. 1.

According to the invention, the solution to the above problem is characterized in that the reaction mixture of polyisocyanates, polyhydroxy compounds or polyamine compounds is combined with the chain-extending agents in a special nozzle before the reaction mixture is introduced into the twin-screw extruder. The products obtained by the new process are distinguished by improved tensile strength, better flow and, above all, better extrudability through reduced gel contents, with all other technologically important properties, such as elongation at break, elasticity moduli and elasticity, retaining the same high standard as in known processes.

The present invention is directed to an improved process for the continuous production of polyurethane and polyurethane urea elastomers by the reaction of A) one or more organic polyisocyanates, B) one or more isocyanate-reactive compounds having molecular weights of from 400 to 10,000, and being selected from the group consisting of polyhydroxy compounds, polyamine compounds, and mixtures thereof, C) one or more chain-extending agents containing at least two active hydrogen atoms and having molecular weights below 400, D) optionally in the presence of monofunctional compounds (such as monoisocyanates, monoalcohols or monoamines), and E) optionally, activators, stabilizers, lubricants and other additives known in the art, wherein the amounts of reactive components are such that the equivalent ratio of isocyanate groups to isocyanate-reactive groups is from 0.9:1 to 1.15:1.

The invention resides in combining the starting materials or starting mixtures (namely an isocyanate-containing component and a hydroxyl- and/or amine-containing component) in a nozzle by passing one of these two components axially through the constriction of the nozzle and introducing the other component laterally into the stream of the first component in the constriction from the side in the form of several partial streams through a corresponding number of bores distributed in the walls of and over the periphery of the constriction, and, thereafter, introducing the product into a twin-screw extruder. In one particularly preferred embodiment, prior to being introduced into the extruder, the mixture is passed through a pipe in which the components react.

It has surprisingly been found that this process can be carried out with low pressure losses. Despite shod residence times, a high degree of conversion can be obtained through the extremely good mixing effect of the nozzle, so that a highly viscous melt is introduced into the twin-screw extruder. In kinetic studies, it was found that the elastomer reaction is predominantly controlled by diffusion and therefore requires intense mixing, especially of the highly viscous phase, for 100% conversion to be achieved. It has surprisingly been found that far shorter reaction times can be obtained with the nozzle of the present invention and that a high rate of conversion can be achieved at manageable viscosities.

The nozzle used is also called an annular nozzle. The constriction of the main stream may take place suddenly or steadily. Since, in general, a pressure loss of only about 3 bar is necessary for obtaining optimal mixing in the annular nozzle, the pressures of the component streams may generally be kept low. Accordingly, the usual pumps may be used and any existing pipe system may be retained. However, higher pressure losses may also be applied providing the disadvantage of higher component pressures is accepted.

Polyisocyanates A) suitable for use in the invention are any of the aliphatic, cycloaliphatic, araliphatic, aromatic and heterocyclic diisocyanates known in the art. Diisocyanates preferably used in accordance with the invention are aromatic diisocyanates such as naphthylene-1,5-diisocyanate, 3,3'-dimethyl-4,4'-diisocyanatodiphenyl (TODI), 1,4-diisocyanato-benzene and the correspondingly hydrogenareal product, tolylene diisocyanates and, more particularly, diphenyl methane diisocyanate isomers. It is particularly preferred to use 4,4'-diisocyanatodiphenyl methane or its isomer mixture with up to 5 mol-% and preferably 1 to 4 mol-% 2,4'-diisocyanatodiphenyl methane, generally with very small quantities of the 2,2'-diisocyanatodiphenyl methane isomer.

The diisocyanates may optionally be used together with up to about 15 mol-% (based on diisocyanate) of a polyisocyanate of higher functionality. However, the quantity in which the higher polyisocyanate is used has to be limited to such an extent that a still meltable or thermoplastic polyurethane elastomer is obtained. A relatively large quantity of higher isocyanates generally has to be compensated by the use of on average less than difunctional hydroxyl or amino compounds or even mono-isocyanates, so that excessive chemical crosslinking of the product is avoided. Examples of isocyanates of relatively high functionality and monofunctional compounds can also be found in the prior art cited above.

Monoamines, such as butyl or dibutyl amine, aniline, piperidine, hydroxyl amine, stearyl amine, and N-methyl stearyl amine; and monoalcohols, such as 1-butanol, 2-ethyl-1-hexanol, 1-octanol, 1-dodecanol, isobutanol or tertiary butanol, cyclohexanol, ethylene glycol monomethyl ether and stearyl alcohol are mentioned as examples. When used, it is preferred that the amount of monofunctional component be relatively small, i.e., from 0.01 to 4% by weight based upon the weight of all the reactants.

Preferred chain-extending agents C) having molecular weights below 400 are known and are described, for example in German Offenlegungsschriften 2,302,564, 2,423,764, 2,549,372, 2,402,840, 2,457,387 and 2,854,384. The compounds in question are, in particular, low molecular weight polyalcohols, (preferably diols), diamines (preferably aliphatic diamines), hydrazines and hydrazine derivatives. Diethyl tolylene diamines and isophorone diamine are also useful. Amino-alcohols, such as diethanolamine and n-methyl diethanolamine, may also be used in accordance with the invention. Preferred chain-extending agents are diols such as, for example, di- and triethylene glycol, 1,6-hexanediol, hydroquinone di-$\beta$-hydroxyethyl ether and, most preferably, 1,4-butanediol, optionally in admixture with other diols. The molecular weight of the chain extenders is in the range from $\geq 18$ to 399 and preferably in the range from $\geq 76$ to 399.

Preferred hydroxy functional, relatively high molecular weight compounds B) include polyester, polyester carbonate and polyether diols, for example polyester diols of linear or branched, aliphatic and/or cycloaliphatic diols and aliphatic dicarboxylic acids, such as adipic acid. However, they may also contain small quantities of aromatic dicarboxylic acids, more particularly phthalic acid and even terephthalic acid, and hydrogenation products thereof. Hydroxyl polycarbonates and hydroxypolycaprolactones are also suitable. Also preferred are hydroxyether diols based on ethylene oxide, propylene oxide or mixed polyethers of propylene oxide and/or ethylene oxide and/or tetrahydrofuran, for example hydroxyether diols based on tetrahydrofuran having molecular weights in the range from 1000 to 3000. Further examples of suitable polyols are described in detail, for example, in German Offenlegungsschriften 2,302,564, 2,423,764, 2,549,372, 2,402,840, 2,854,384, 2,920,501, and 3,405,531, German Auslegeschrift 2,457,387, and U.S. Pat. Nos. 3,963,679, 3,984,607, and 4,035,213.

Relatively high molecular weight polyamine compounds B), preferably containing primary aromatic amino groups, may also be used. Preferred representatives are obtained, for example, by (preferably basic) hydrolysis of corresponding NCO polymers based on relatively high molecular weight polyhydroxy compounds and excess aromatic diisocyanates. Examples of these products and processes for their manufacture can be found in German Auslegeschriften 2,948,419, 3,039,600, and 3,112,118, and European Patents 61,627, 71,132 and 97,869. The first of these patent specifications also mentions other known processes for the production of aromatic amino compounds of relatively high molecular weight (so-called amino-polyethers) which are suitable for use in the process according to the invention. Other production processes are described in German Auslegeschriften 1,694,152, and 1,155,907, and in French Patent 1,415,317.

The usual auxiliaries E), such as catalysts, release agents, antistatic agents, flameproofing agents and pigments, (see, for example, German Auslegeschrift 2,854,409, German Offenlegungsschrift 2,920,501 and German Patent 3,329,775) may of course be added before and/or during and/or after the polyurethane reaction. Antioxidants and UV absorbers (light stabilizers) may also be added in accordance with the prior art (see German Auslegeschrift 3,405,531).

Suitable catalysts include, for example, tertiary amines, organometallic compounds, and more particularly organotin compounds, organolead compounds and organotitanium compounds. Examples of organometallic compounds include tin(II) acetate, tin(II) ethyl hexoate, dibutyl tin dilaurate and lead acetate.

Preferred release agents include waxes and oils, long-chain compounds containing carboxyl, ester, amide, urethane or urea groups and silicones, for example of the type mentioned as release agents in German Offenlegungsschrift 2,204,470.

In the process according to the invention, the quantities of reaction components A) to E) for the polyurethanes are generally selected so that the equivalent ratio of isocyanate groups to isocyanate-reactive groups is from 0.9:1 to 1.15:1 and preferably from 0.95:1 to 1.03:1.

The components mentioned may be homogenized in the annular nozzle in pure form or in the form of completely or partly reacted mixtures and subsequently reacted. The streams introduced into the nozzle are either 1) the isocyanate-containing component and
2) all the remaining components, or
3) the isocyanate-reactive components and
4) all the remaining components.

In either case, whichever of the components is used in the larger volume is preferably guided axially through the constriction of the nozzle. In other words, the larger volume component is guided axially through the constriction. For example, if the isocyanate-containing component is the larger volume component when compared to the volume of the remaining components, then the isocyanate component will be guided axially through the constriction. Where substantially the same volume streams are used, each of the two components may form the middle stream or sidestream. Observing these measures ensures optimal mixing and, hence, a satisfactory reaction.

In one preferred embodiment, a flow rate of 1 to 10 m/sec. is maintained in the constriction. However, higher flow rates, for example up to 50 m/sec., can be maintained in the constriction providing the disadvantage of the high pump pressure required for this purpose is accepted. Conversely, the pump pressure can of course advantageously be kept low at the preferred flow rate of 1 to 10 m/sec.

The constriction preferably has a constant diameter D over its entire length L.

The length L is preferably at least twice the diameter D of the constriction. This configuration provides for particularly intensive mixing and adequately stabilizes the flow conditions.

In one particularly advantageous embodiment, the length $L_1$ of the constriction of the axial stream to the point where it is combined with the streams of the second component is between 0.5 and 2 times the diameter D of the constriction.

In another particular embodiment of the process, prior to being introduced into the extruder, the product stream resulting from both streams is subjected to a constant constriction over a length $L_2$ at least equal to the length of the path in which the reaction of the free isocyanate is largely complete. In general, the length $L_2$ is at most four times the diameter D. Greater lengths $L_2$ lead to higher pressure losses without any advantage accruing.

The dimensions described above ensure that there is no caking in the nozzle.

A particularly high yield can be obtained with a ratio of the axial stream $\epsilon_A$ to the lateral stream $\epsilon_S$ of from 0.01 to 1.0, preferably 0.02 to 0.5 and, more preferably, 0.03 to 0.25. This ratio can be calculated according to the following formula:

$$\frac{\epsilon_A}{\epsilon_S} = \frac{\delta_A \cdot V_A \cdot v_A^2}{\delta_S \cdot V_S \cdot v_S^2}$$

where $\delta$ is the density of the particular stream (in kg/m$^3$), V is the volume of the particular stream (in m$^3$), v is the flow rate of the particular stream, the subscript A represents the axial stream and the subscript S represents the lateral stream. The high yield obtainable in this way also guarantees a low energy input.

In another particular embodiment, the flow cross-section is steadily enlarged after the constriction. This rules out the possibility of swirling and backflow. It is obvious that the widening of the flow cross-section ends at a maximum which corresponds to the diameter of an adjoining pipe. Avoiding backflow ensures that no caking or blockages can occur.

In another variant of the process, the number i of bores for the lateral streams is between $2 \leq i \leq m$ and preferably between $4 \leq i \leq m$, m being derived from the condition $$\frac{\pi \cdot D}{m \cdot d} \geq 1.1, \text{ preferably } > 1.5 \text{ and, more preferably} \geq 2,$$

with D being the diameter of the constriction and d being the diameter of the bores.

This measure also has a favorable effect on mixing and hence on the reaction and on the avoidance of caking.

All the bores are preferably arranged in a common plane perpendicular to the constriction although other arrangements are also possible. This ensures that the reaction can only start in this plane, i.e. already reacting product no longer comes into contact with the second component. This also reduces the danger of caking.

In a preferred embodiment of the process, a prepolymer/polyisocyanate mixture is mixed in the nozzle with a component containing chain-extending agent. Since the prepolymer/polyisocyanate mixture generally represents the greater volume stream, it is generally passed through the constriction in accordance with the foregoing observations.

The mixing unit crucial to the invention is described in more detail with reference to the drawings. In the drawing, the reference numerals have the following meanings:

(1) nozzle to be used in accordance with the invention
(2) feed pipe for the main stream
(3) sudden constriction of the main stream
(4) insert with built-in lateral bores causing the constriction
(5) side bores
(6) feed pipe for the sidestream
(7) chamber surrounding the constriction (3) from which the bores (5) lead away
(8) steady widening at the nozzle exit
(9) discharge pipe
D internal diameter of the constriction
d diameter of the side bores
L overall length of the constriction
$L_1$ distance from the beginning of the constriction to the plane of the side bores
$L_2$ distance from the plane of the side bores to the beginning of the steady widening Nozzles of the type useful herein are known for use in the production of isocyanates from amines and phosgene (see, e.g., U.S. Pat. No. 5,117,048).

The production of reaction mixtures using the mixing unit according to the invention may be carried out, for example, as follows:

The main stream is delivered to a nozzle 1 through a feed pipe 2 which suddenly changes into a constriction 3 arranged in the nozzle 1. The constriction 3 is arranged in an insert 4. The constriction 3 has a constant diameter D over its entire length L. In the section $L_1$ which corresponds, for example, to 1.5 times the diameter D of the constriction 3, bores 5, for example six in number, are regularly distributed over the circumference. Mutually opposite bores (5) are offset from one another by the diameter d so that the streams sprayed in pass by one another. The second component is delivered through a feed pipe (6) to a chamber (7) surrounding the constriction (3) from which the bores (5) lead off. The length $L_2$ of the constriction (3) behind the bores (5) corresponds, for example, to the diameter D of the constriction (3) and, hence, to substantially that section in which the reaction of the free isocyanate is largely complete. Behind the constriction (3), the nozzle (1) undergoes constant widening (8) at an angle α with the axis of, for example, 20°. The widening (8) is adjoined by a discharge pipe (9) of the same diameter as the feed pipe (2).

The reaction mixtures prepared using the mixing unit according to the invention are introduced into a twin-screw extruder of the type described in detail in commercial literature (Werner % Pfieiderer, Stuttgart) or in the above-mentioned patents and articles.

The products obtained by the process according to the invention have improved tensile strengths, better flow and, above all, better extrudability through reduced gel contents, with all other technologically important properties, such as elongation at break, elasticity modulus, elasticity, retaining the same high standard as in known processes.

The invention is illustrated by the following Examples.

A self-cleaning twin-screw extruder of the ZSK 83 type manufactured by Werner & Pfleiderer was used in the following Examples.

EXAMPLES

Example 1 (comparison)

100 parts by weight of a polyester of adipic acid and 1,4-butanediol (OH number 50, acid value 0.7) activated with 10 ppm titanium tetrabutylate, 10 parts 1,4-butanediol and 40 parts by weight liquid 4,4'-diisocyanatodiphenyl methane were introduced simultaneously and continuously in a constant quantitative ratio into the front most feed point (housing 1) of the twin-screw extruder and reacted in accordance with the examples of German Offenlegungsschrift 2,302,564.

A homogeneous, clear and transparent polyurethane having a tensile strength (DIN 53 504) of 45 MPa for an elongation at break (DIN 53 504) of 540%, a rebound resilience of 43%, a modulus of elasticity at 100% elongation of 5.4 MPa, a Shore hardness A of 86 and a melt viscosity (melt volume index) of 17 g/10 mins. (10 kp) was obtained.

Example 2 (process according to the invention)

100 Parts by weight of a polyester of adipic acid and 1,4-butanediol (OH number 50, acid value 0.7) activated with 10 ppm titanium tetrabutylate were continuously reacted with 40 parts by weight liquid 4,4'-diisocyanatodiphenyl methane in a constant quantitative ratio to form a prepolymer which was then continuously mixed with 10 parts 1,4-butanediol in a constant ratio in the special nozzle described in the foregoing by passing the prepolymer through the constriction and laterally introducing the butanediol through the bores. The reaction product formed was introduced into the front most feed point (housing 1) of the twin-screw extruder and reacted therein.

A homogeneous, clear and transparent polyurethane having a tensile strength (DIN 53 504) of 54 MPa for an elongation at break of 560% (DIN 53 504), a rebound resilience of 43%, a modulus of elasticity at 100% elongation of 5.6 MPa, a Shore A hardness of 86 and a melt viscosity (melt volume index) of 21 g/10 mins (10 kp) was obtained.

The gel content is distinctly smaller than in the products obtained by the process according to Example 1.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the continuous production of polyurethane and polyurethane urea elastomers by reacting
   A) one or more organic polyisocyanates,
   B) one or more isocyanate reactive compounds having molecular weights of from 400 to 10,000 and being selected from the group consisting of polyhydroxyl compounds, polyamine compounds, and mixtures thereof,
   C) one or more chain-extending agents containing at least two active hydrogen atoms and having molecular weights below 400,
   D) optionally, one or more monoisocyanates and/or compounds monofunctional to isocyanates, and,
   E) optionally one or more activators, stabilizers, lubricants and other additives, wherein the amounts of reactive components are such that the equivalent ratio of isocyanate groups to isocyanate-reactive groups is from 0.9:1 to 1.15:1, the improvement wherein the isocyanate-containing component and the isocyanate-reactive components are combined in a nozzle by passing one of these two components axially through the constriction of the nozzle and introducing the other component laterally into the stream of the first component in this constriction from one side in the form of several partial streams through a corresponding number of bores distributed over the periphery of the constriction and then introducing the product formed into a twin-screw extruder.

2. The process of claim 1, wherein whichever component has the larger volume is passed axially through the constriction.

3. The process of claim 1, wherein a flow rate of 1 to 10 m/sec. is maintained in the constriction.

4. The process of claim 1, wherein the constriction has a constant diameter over its length.

5. The process of claim 4, wherein the length corresponds to at least twice the diameter of the constriction.

6. The process of claim 1, wherein the length of the constriction of the axial stream to the point where it is combined with the streams of the second component is between 0.5 and 2 times the diameter of the constriction.

7. The process of claim 1, wherein prior to being introduced into the extruder, the mixture resulting from both streams is subjected to a constant constriction over a length of at most four times the diameter of the constriction.

8. The process of claim 1, wherein the ratio of the axial stream $\epsilon_A$ to the lateral stream $\epsilon_S$ is from 0.01 to 1.0 and is determined according to the formula:

$$\frac{\epsilon_A}{\epsilon_S} = \frac{\delta_A \cdot V_A \cdot v_A^2}{\delta_S \cdot V_S \cdot v_S^2}$$

where $\delta$ is the density of the particular stream, V is the volume of the particular stream, v is the flow rate of the particular stream, the subscript A represents the axial stream and the subscript S represents the lateral stream.

9. The process of claim 1, wherein the flow cross-section widens steadily after the constriction.

10. The process of claim 1, wherein the number i of bores for the lateral streams is between $2 \leq i \leq m$, m being derived from the condition $$\frac{\pi \cdot D}{m \cdot d} > 1.1,$$

with D being the diameter of the constriction and d being the diameter of the bores.

11. The process of claim 1, wherein the mixture of components A) and B) is passed axially through the constriction, optionally in the presence of components D) and/or E), and the stream of component C) is passed through the lateral bores, optionally in the presence of components D) and/or E).

12. The process of claim 1, wherein the mixture of components A) and B) is delivered to the nozzle at a minimum temperature of 100° C.

* * * * *